Patented Apr. 7, 1936

2,036,728

UNITED STATES PATENT OFFICE 2,036,728

METHOD FOR TREATING CAVITIES IN DECAYED TEETH BEFORE STOPPING

Otto Simon, Berlin-Lankwitz, Germany

No Drawing. Application April 25, 1935, Serial No. 18,216. In Germany November 12, 1932

5 Claims. (Cl. 32—15)

Besides metallic stoppings, such as amalgams, dental cements are employed for stopping the cavities in decayed teeth. These cements are pulverous substances of inorganic nature which, on being stirred with a mixing liquid, such as phosphoric acid, set and harden. These dental cements are divided into two groups, namely those which are only intended for a temporary stopping and which remain relatively soft and pliable or can easily be again removed, and those which last as long as possible, become hard and solid and cannot be removed without being completely destroyed. This last group includes the so-called silicate cements, produced by melting or precipitation, and also phosphate cements or the like.

It has already been proposed to use dental cements of the last mentioned kind for stopping the cavities of decayed teeth, at the same time in conjunction with water-soluble compounds of organic substances which form water-insoluble compounds by reaction with the components of the dental cement. The mentioned known cements are phosphate and silicate cements or combinations thereof. The silicate cements consist, as well known, of silicic acid and compounds of aluminium, calcium, magnesium, beryllium. The phosphate cements consist—as also well known— of burnt zinc oxide and phosphoric acid and certain additions like zinc phosphate, zinc pyrophosphate, compounds of aluminium; sometimes they contain a certain percentage of silicates.

By employing the mentioned soluble compounds of organic substances, a perfectly tight closure of the pulp from the outer side is obtained. Bacteria are prevented from penetrating into the tooth cavity and thus causing very serious injury to health. However, at the same time the components of the dental cement, especially the cement acid, are prevented from acting on the pulp and causing the same to die. By adding soluble compounds of organic substances which form insoluble compounds by reaction with the components of the dental cement, at the same time the dental cement proper is, however, also protected from attacking the dentine, the density and resistance against the saliva and the substances contained in the foods, and especially the strength, especially the edge strength, and the adhesion of the cement on the teeth are considerably increased.

Water-soluble compounds of organic substances which come into question according to the mentioned method are, for example, water-soluble salts of higher fatty acids, mineral acid esters or alcoholates of high molecular aliphatic alcohols. These include: alkali soaps of the stearin-, olein-, palmitin-acid, sulphuric acid-, hydrochloric acid-, nitric acid-, phosphoric acid-esters of such higher alcohols, which exist in nature in solid state, for example cetylalcohol. Acid derivatives of higher fatty acids, such as sulphonated castor oil, or alkali compounds thereof, are particularly suitable.

The desired effect will be obtained in a particularly favorable way if the procedure according to the present invention, hereinafter described, is followed.

The water-soluble compound of organic substances is first introduced into the tooth cavity in the form of a solution, for example in light volatile solvents (chloroform, alcohol and the like), after the cavity has been washed out and carefully dried, the tooth cavity being for example painted with such a solution. The dental cement, for example silicate cement, is then mixed with the making up liquid and this pasty mixture inserted in the cavity. The setting and hardening of the dental cement takes place in the usual manner.

It is also possible, to employ for coating the tooth cavity a solution which contains simultaneously components of the dental cement besides the water-soluble compound of an organic substance. Thus, the good adhesion of the dental cement to be subsequently introduced into the tooth cavity is assisted.

Instead of employing a single substance, mixtures may also be employed, which contain for example colloidal mineral substances, such as silicic acid gel, alumina hydrate and the like, besides the compound of the organic substance. The employment of salts, for example soluble salts for producing a protecting coating, such as $CaCl_2$, $CaH_4(PO_4)_2$, may also be mentioned.

Other mixtures may advantageously be employed, which also contain antiseptic substances and particularly substances which give up oxygen. Such substances which give up oxygen are for example hydrogen peroxide, peroxide metal compounds, such as $ZnO_2$ and the like. The antiseptic substances may also be such which are capable of acting on the nerve of the tooth.

The media according to the invention may also be employed in pulpy or pasty condition, but they are preferably used in the form of a solution as in this form a better distribution in the tooth cavity and the densest lining are insured.

The new process has the advantage that the liquid, which is water-soluble from the beginning, may penetrate more perfectly into the dentinal tubules and hardens only when afterwards brought into contact with the dental cement, thereby becoming insoluble.

The special process of using a mixture of the proposed products with parts of the cement for the lining has the special advantage of accelerating the above mentioned reaction of forming insoluble compounds.

This application is in part a continuation of application, Ser. 698,215, filed Nov. 15, 1933.

Having thus described the invention, I claim:

1. Method of filling cavities of decayed teeth by means of long lasting dental cement principally of inorganic compounds, comprising lining a cavity with a solution of water-soluble compounds of organic substances which form insoluble compounds by reaction with the components of the dental cement, and in subsequently inserting the dental cement in the cavity.

2. Method of filling cavities of decayed teeth by means of long lasting dental cement principally of inorganic compounds, comprising lining a cavity with a sulphonated substance containing castor oil, and in subsequently inserting the dental cement in the cavity.

3. Method of filling cavities of decayed teeth by means of long lasting dental cement principally of inorganic compounds, comprising lining a cavity with a mixture containing colloidal mineral substances besides the water-soluble compounds of organic substances which form insoluble compounds by reaction with the components of the dental cement, and in subsequently inserting the dental cement in the cavity.

4. Method of filling cavities of decayed teeth, by means of long lasting dental cement principally of inorganic compounds, comprising lining a cavity with a mixture containing antiseptic substances which give off oxygen, and water-soluble compounds of organic substances which form insoluble compounds by reaction with the components of the dental cement, and in subsequently inserting the dental cement in the cavity.

5. Method of filling cavities of decayed teeth, by means of long lasting dental cement principally of inorganic compounds, consisting in lining a cavity with a mixture containing a soluble substance which forms insoluble compounds by reaction with components of the dental cement and parts of the cement, and in subsequently inserting the dental cement in the cavity.

OTTO SIMON.